May 21, 1968  A. E. ABRAMSON ET AL  3,384,526
METHOD AND MACHINE FOR JOINING PLASTICS
Filed Sept. 2, 1965  8 Sheets-Sheet 1
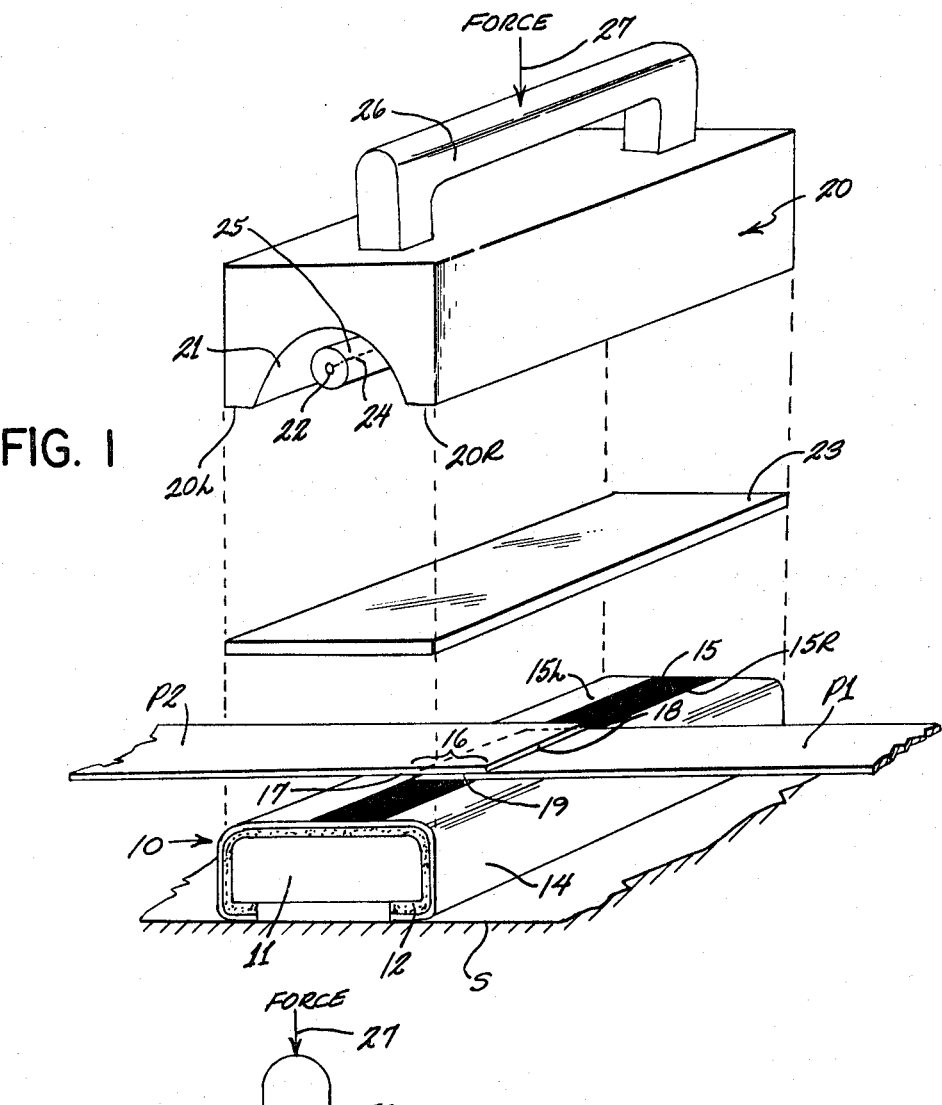
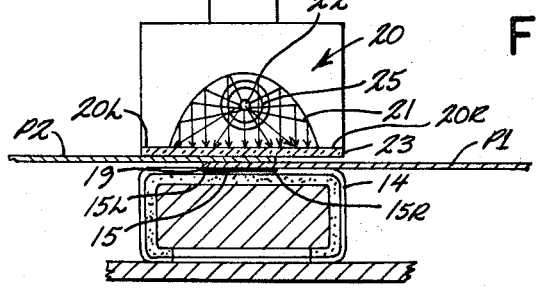
INVENTORS
ANDREW E. ABRAMSON
ANDREW F. KITCHAR
BY
Dugger, Johnson & Westman
ATTORNEYS

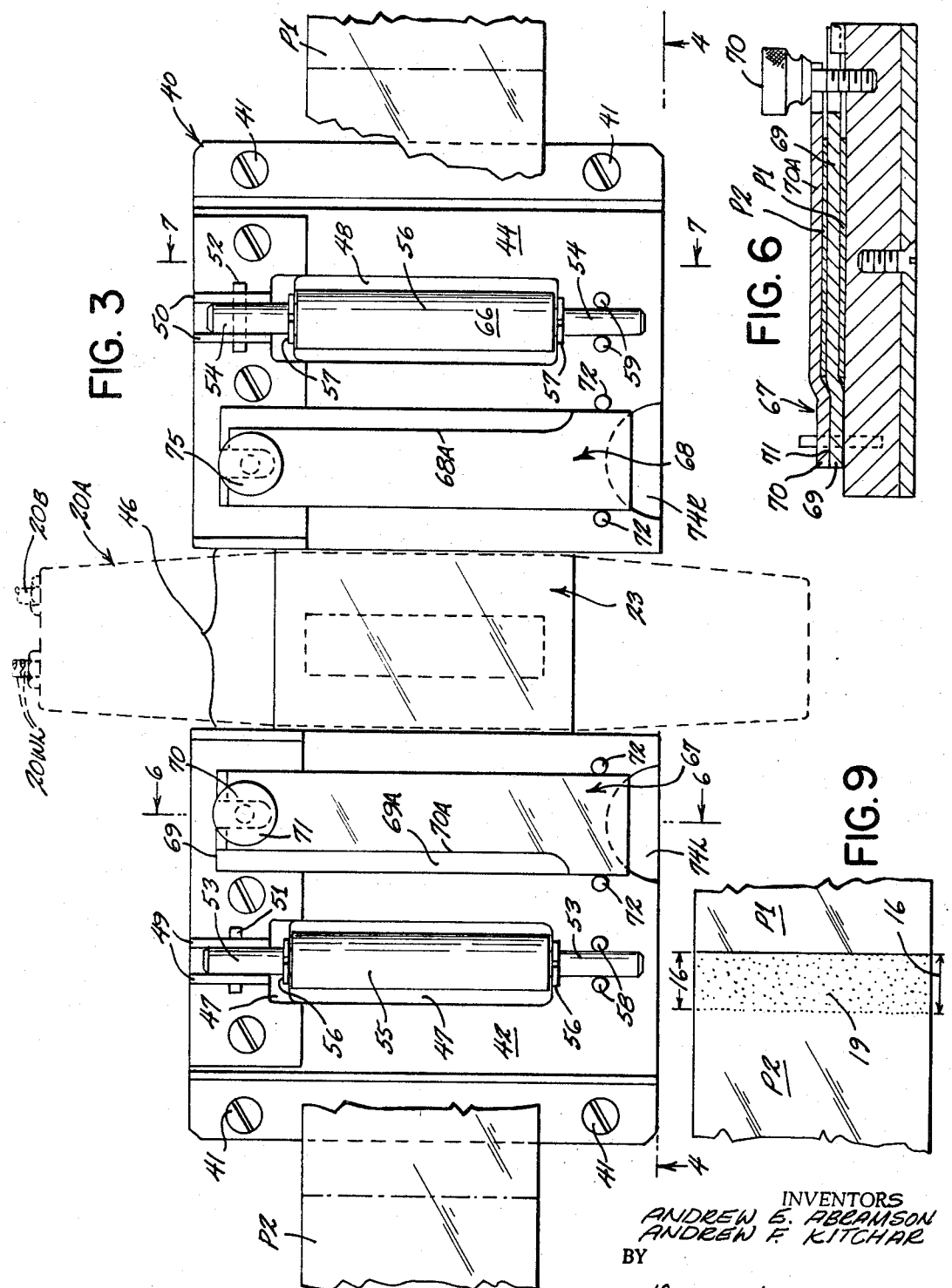

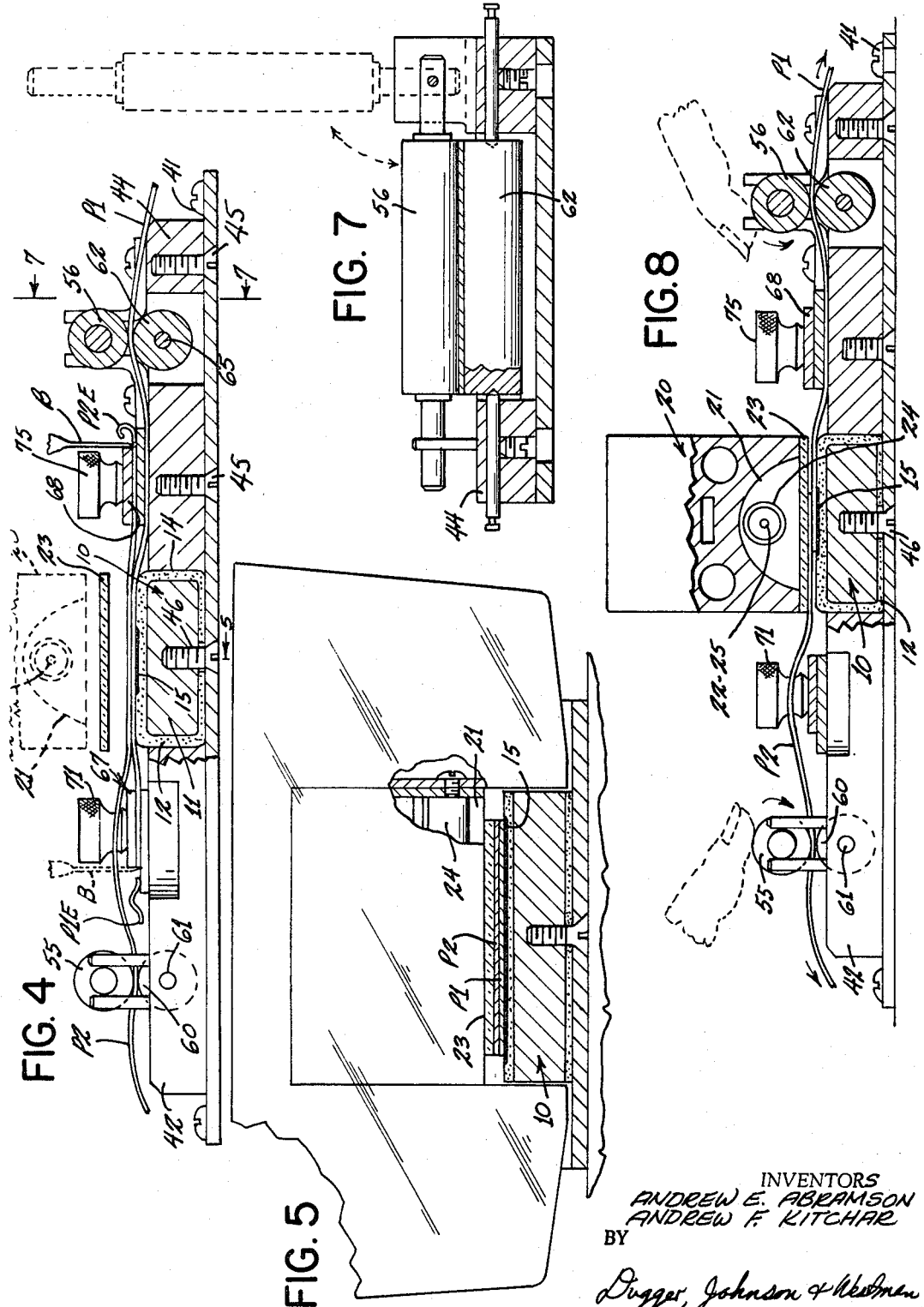

May 21, 1968 A. E. ABRAMSON ET AL 3,384,526
METHOD AND MACHINE FOR JOINING PLASTICS
Filed Sept. 2, 1965 8 Sheets-Sheet 4
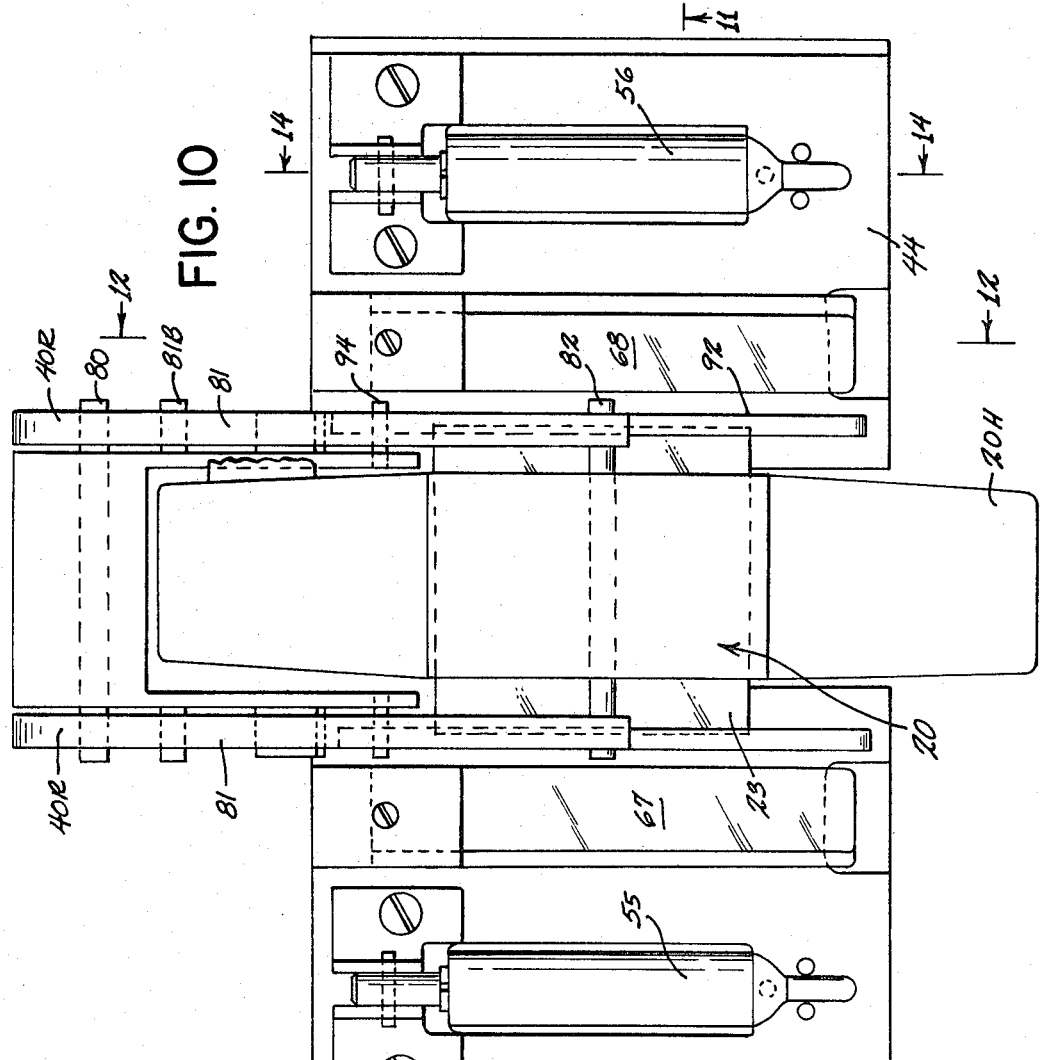
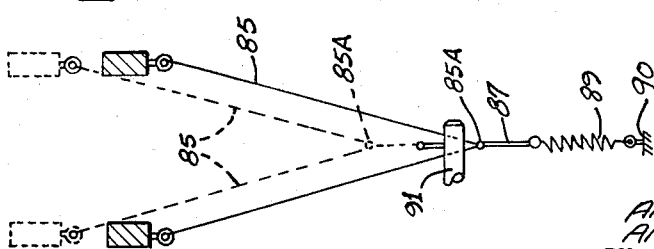
INVENTORS
ANDREW E. ABRAMSON
ANDREW F. KITCHAR
BY
Dugger, Johnson & Westman
ATTORNEYS May 21, 1968 A. E. ABRAMSON ET AL 3,384,526
METHOD AND MACHINE FOR JOINING PLASTICS
Filed Sept. 2, 1965 8 Sheets-Sheet 5

INVENTORS
ANDREW E. ABRAMSON
ANDREW F. KITCHAR
BY
Dugger, Johnson & Westman
ATTORNEYS May 21, 1968   A. E. ABRAMSON ET AL   3,384,526
METHOD AND MACHINE FOR JOINING PLASTICS
Filed Sept. 2, 1965   8 Sheets-Sheet 6
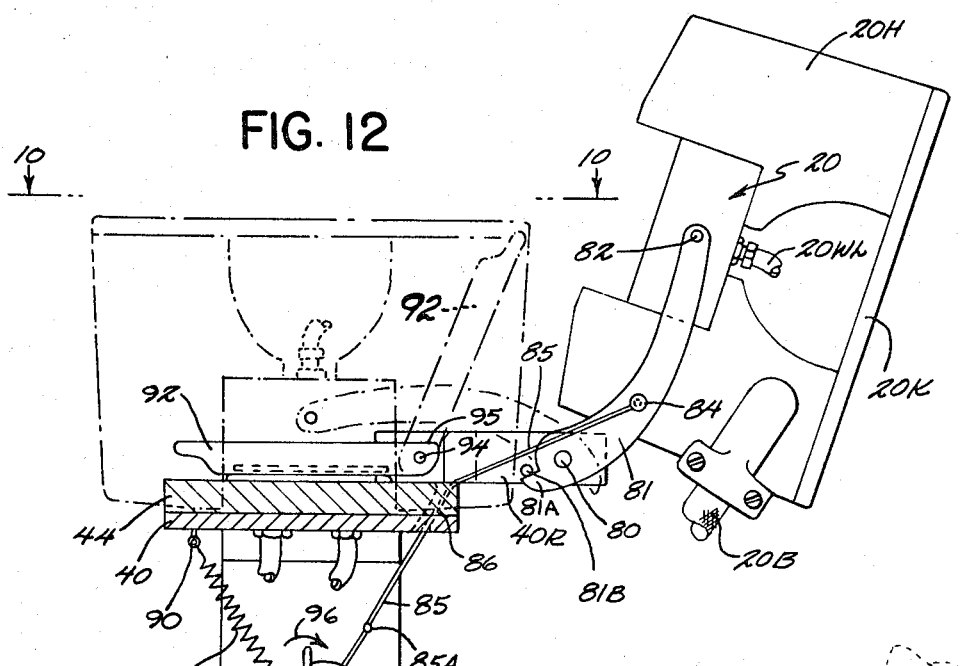
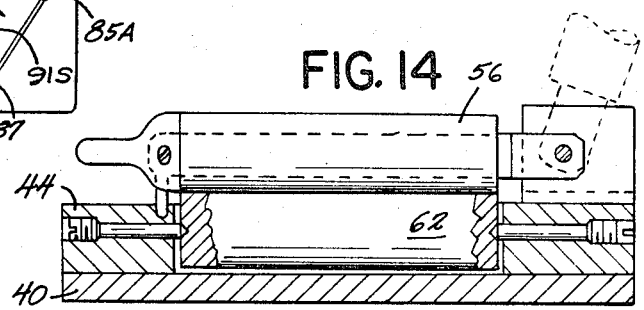
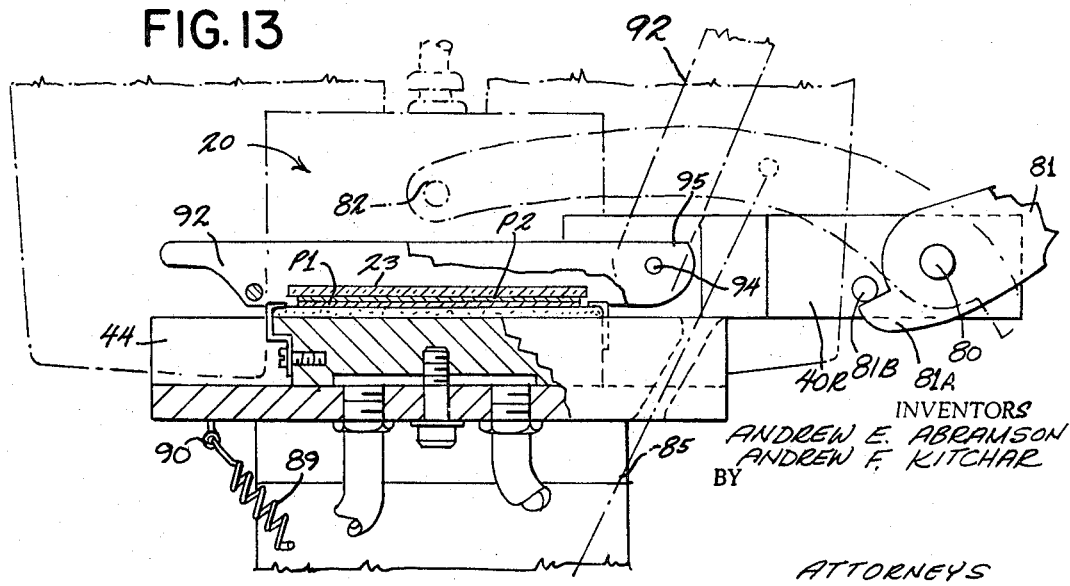
INVENTORS
ANDREW E. ABRAMSON
ANDREW F. KITCHAR
BY
ATTORNEYS May 21, 1968 A. E. ABRAMSON ET AL 3,384,526

METHOD AND MACHINE FOR JOINING PLASTICS

Filed Sept. 2, 1965 8 Sheets-Sheet 7

INVENTORS
ANDREW E. ABRAMSON
ANDREW F. KITCHAR
BY

Dugger, Johnson & Westman
ATTORNEYS

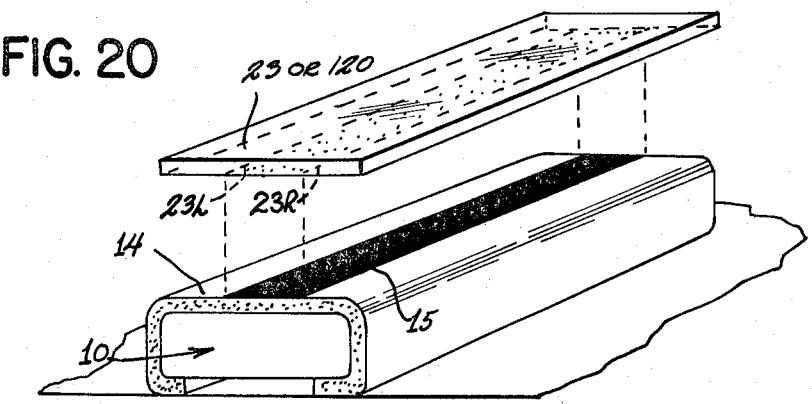
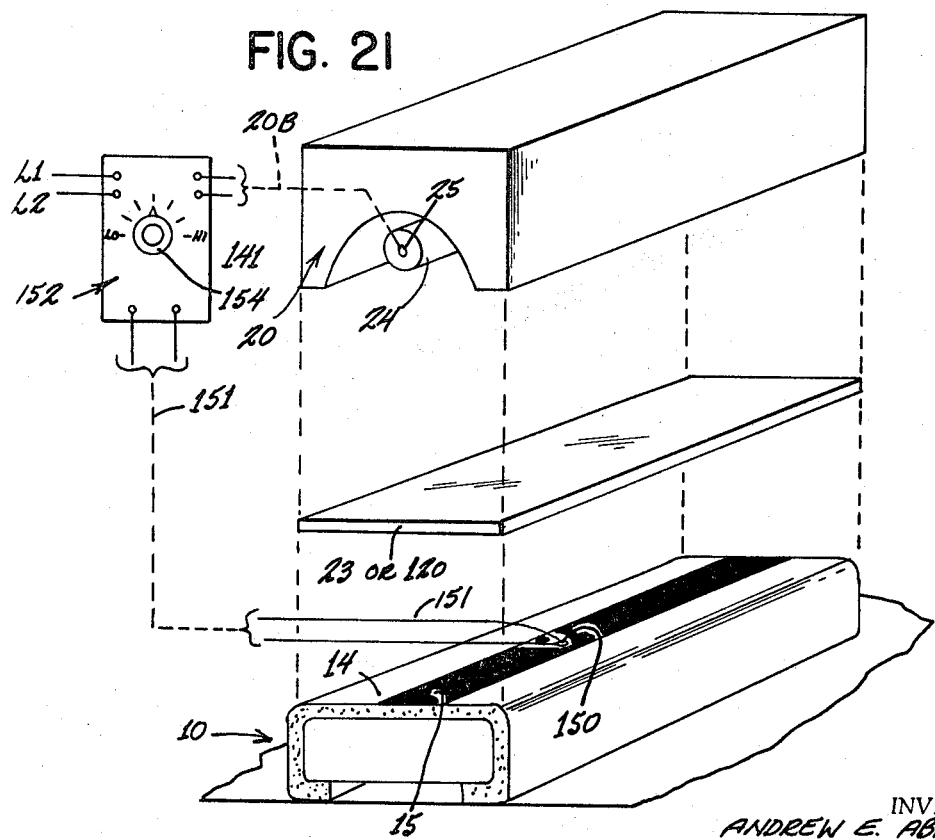

United States Patent Office 3,384,526
Patented May 21, 1968

3,384,526
METHOD AND MACHINE FOR JOINING
PLASTICS
Andrew E. Abramson and Andrew F. Kitchar, Excelsior, Minn., assignors, by mesne assignments, to Research, Incorporated, a corporation of Minnesota
Filed Sept. 2, 1965, Ser. No. 484,545
14 Claims. (Cl. 156—499)

This invention relates to methods and machines for joining plastics, and particularly to methods and machines for joining sheet plastic materials. This may also be called "fusion welding." The invention has a special utility in the joining of plastics which have a very high melting point, and which are difficult to join by any other presently known methods or machines.

It is an object of the invention to provide methods and machines for joining plastics.

It is another object of the invention to provide methods and machines for joining sheet plastics. It is another object of the invention to provide methods and machines for joining plastics of high melting point.

Other and further objects are those inherent in the methods and apparatus herein illustrated, described and claimed and will be apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The methods and apparatus of the invention are illustrated with reference to the drawings in which:

FIGURE 1 is an exploded isometric view of exemplary components, with parts separated;

FIGURE 2 is an end view, partly in section, of the apparatus shown in FIGURE 1 when assembled in working condition;

Figure 11:
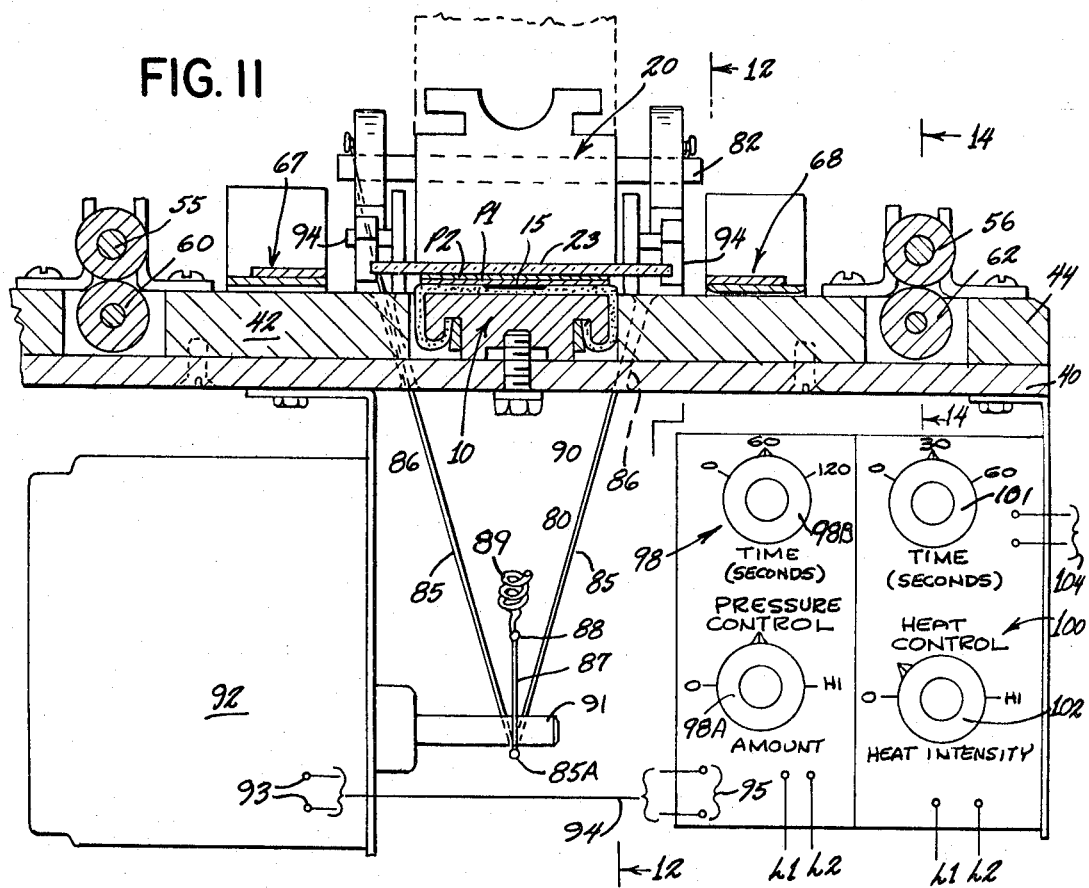

FIGURES 3–9 illustrate an embodiment of a machine of the invention, which may be utilized for carrying out the method of the invention. FIGURE 3 is a plan view. FIGURE 4 is a side elevational view, partly in section, taken in the direction of arrows 4—4 of FIGURE 1. FIGURE 5 is a sectional view, partly in elevation, taken along the line and in the direction of arrows 5—5 of FIGURE 4. FIGURE 6 is an enlarged transverse sectional view taken along the line and in the direction of arrows 6—6 of FIGURES 1 and 4. FIGURE 7 is a transverse sectional view partly in elevation, taken along the line and in the direction of arrows 7—7 of FIGURES 1 and 4. FIGURE 8 corresponds to FIGURE 4 and illustrates certain method steps in the invention. FIGURE 9 is a plan view of a strip of plastic joined according to the present invention;

FIGURES 10–15 illustrate a further embodiment of the apparatus of the invention, which may be utilized for carrying out the methods of the invention. FIGURE 10 is a plan view. FIGURE 11 is a longitudinal sectional view, partly in elevation, taken along the line and in the direction of arrows 11—11 of FIGURE 10. FIGURE 12 is a transverse sectional view, partly in elevation, taken along the line and in the direction of arrows 12—12 of FIGURES 10 and 11, showing in full lines, the apparatus in the open or loading condition. FIGURE 13 is an enlarged fragmentary transverse sectional view, showing portions of the apparatus illustrated in FIGURE 12. FIGURE 14 is a transverse sectional view showing some of the parts in elevation, taken along the line and in the direction of arrows 14—14 of FIGURE 10. FIGURE 15 is a developed view of the winding harness portion of the apparatus shown in FIGURES 12 and 13.

Figure 19:
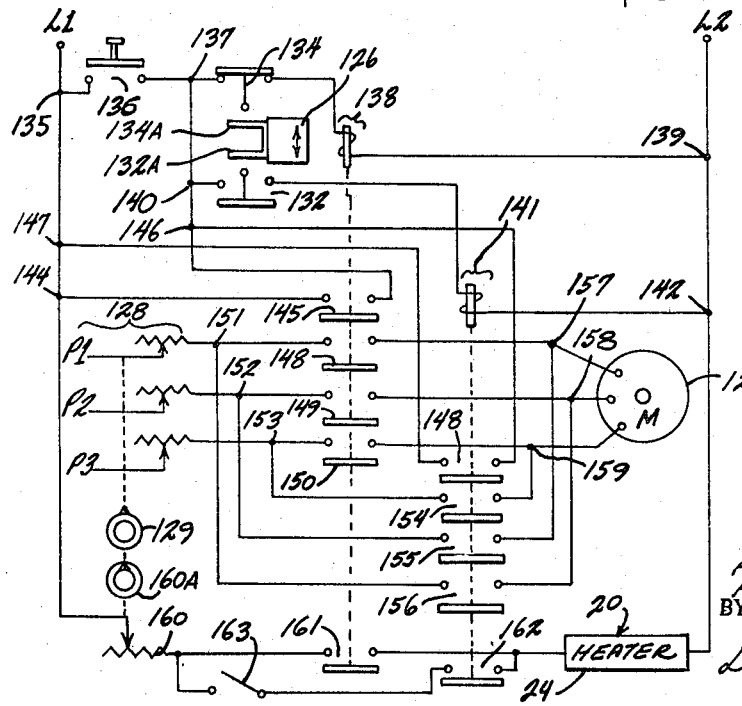
Figure 16:
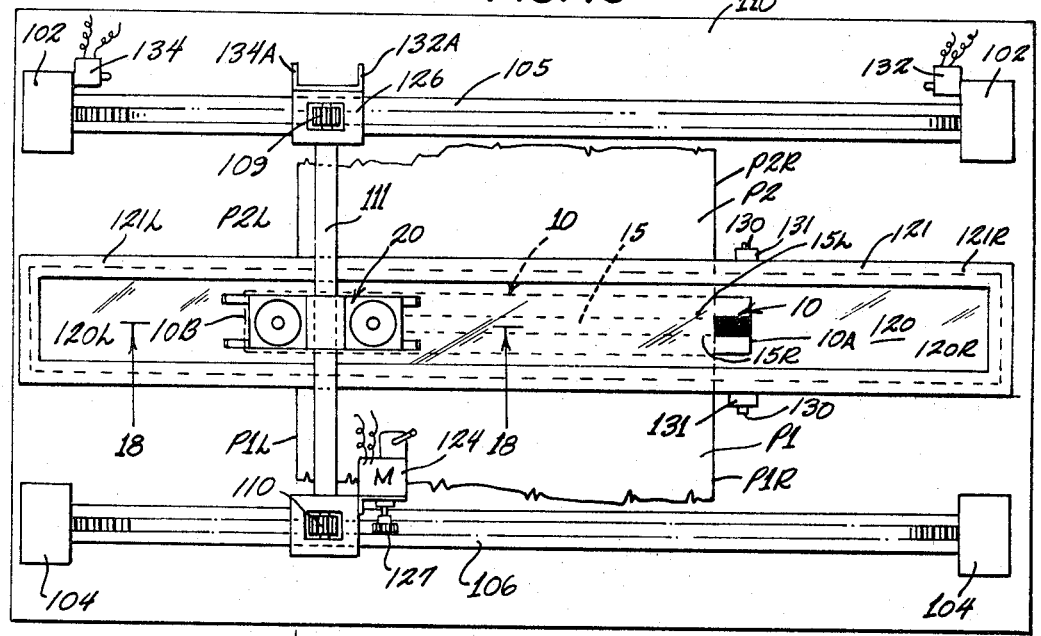
Figure 17:
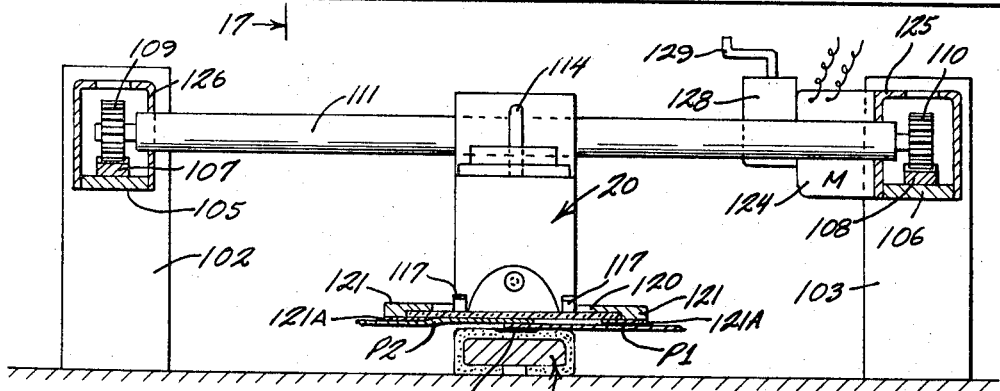
Figure 18:
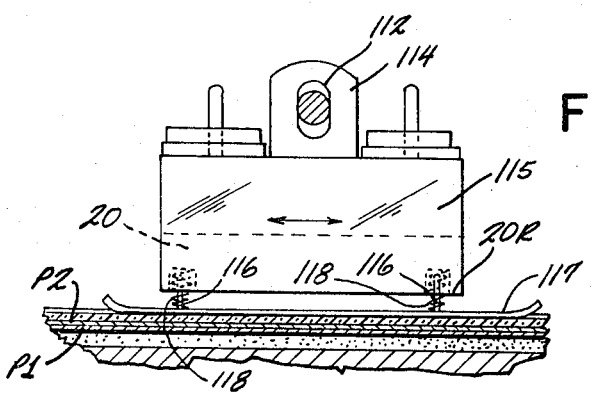

FIGURES 16–19 illustrate a further embodiment of the machine of the invention for joining of the edges of wide sheets of material. FIGURE 16 is a plan view. FIGURE 17 is a longitudinal sectional view taken along the line and in the direction of arrows 17—17 of FIGURE 16. FIGURE 18 is a fragmentary transverse sectional view somewhat enlarged, taken along the line and in the direction of arrows 18—18 of FIGURE 16. FIGURE 19 is a wiring diagram for the machine of FIGURES 16–18;

FIGURE 20 is an exploded isometric view showing a modified embodiment of the invention; and FIGURE 21 is an exploded schematic view showing another embodiment of the invention.

Throughout the drawings, corresponding numerals refer to the same parts.

The invention is applicable to the joining of plastics which are capable of transmitting at least some heat radiations. Where plastics are joined by fusion and contact, this is sometimes called fusion welding. The invention is not applicable where the plastics are filled with opaque material and hence unable to transmit at least some heat radiations, or to plastic materials which are inherently incapable of transmitting heat radiations.

In carrying out the invention, plastic bodies which are capable of transmitting heat radiations to at least some degree, are placed in contact with each other throughout the areas of the bodies which are to be joined. Then radiant heat energy from a radiant heat source of high intensity is projected against one of the bodies so that at least some portions of the rays of heat energy will pass through one of the bodies and through the area to be joined and thence through the other body. The heat radiations which have been transmitted through both plastic bodies are accordingly projected against a heat absorbing surface which is in contact with the plastic body through which the radiations have last passed, such heat absorbing surface being faced toward the radiant heat source, so as to absorb the rays therefrom. The heat absorbing surface is of a shape and configuration so as generally to coincide with the areas of the plastic bodies which are to be joined and is positioned so as to be juxtaposed. Hence the heat absorbing surface coincides with the area of the surfaces which are to be joined and is separated therefrom only by the thickness of the second plastic body through which such rays have passed after having passed through the first plastic body and the area of contact between the plastic bodies. On an average the heat radiations are projected normal to the area of contact and the heat absorbing surface.

A portion of the radiant heat energy is usually absorbed by the plastic material itshelf, and this serves to heat the plastic which is to be joined. For thicker plastic bodies the internally absorbed heat is especially desirable since most plastic materials are inherently poor heat conductors. The heat absorbed internally by the plastics thus serves to minimize the amount of heat which is needed to be conducted into the plastic bodies from the adjacent surfaces.

Also, if desired, the heat radiations, before being projected through the first plastic body may be passed through a presser plate which applies pressure to the first plastic body and hence through the area of contact and second plastic body and against said heat absorber. The presser plate may be substantially transparent or partially transparent in respect to the heat radiations. Where such presser plate is partially transparent, the area of such partial transparency may be located on the surface of the presser plate which is in contact with the first plastic body against which it faces, and some of the heat radiations will thus be captured on such partially transparent surface with consequent elevation of the temperature of said surface, and this surface will also serve to transfer the thus captured heat by conduction to the first plastic body.

The remainder of the heat radiations, which are not captured by the presser plate, will pass through or be partially absorbed by the plastic bodies as above mentioned and will then impinge upon the heat absorber surface. The heat absorber surface may, and usually will, also act as a support surface for clamping the plastic bodies in cooperation with the presser plate which it faces.

This heat absorbing source is usually of dark color, and, depending upon the heat transmissibility of the plastic bodies, is usually made black color, and is rapidly heated by the radiant heat energy impinging upon it, and conducts heat directly back to that one of the plastic bodies which it faces and contacts, and through it to the area of contact between the plastic bodies which is to be joined. The condition of contact between the plastic body and the heat absorbing surface will insure conduction of heat from such surface to the plastic body it engages.

The combination of all of these effects rapidly brings the plastic bodies to a temperature at which fusion of the plastic is incipient, and while so heated, the plastic bodies, the surfaces of which to be joined being then tacky, are pressed against each other and are accordingly joined by fusion. This may also be designated "heat welding."

According to this invention, for the radiant heat source there may be utilized a radiant heat lamp. Such a lamp may be obtained as stock items, such as Model 5305 strip heaters sold by Research, Inc. of Minneapolis, Minn. Such radiant heat source utilizes a high temperature filament enclosed in a quartz tube. The high temperature filament generates radiant heat and also visible rays. In such exemplary heater a parabolic reflector is supplied as a part of the heater unit and the radiations are thus given a directive effect which is useful. Cylindrical reflectors may also be used. It is desirable to have rays projected so as to be generally evenly distributed and generally normal to the area of contact which is to be joined, so that the plastic will be evenly heated throughout said area of contact. To this end a shape of heat source (line or spot) and corresponding reflector (parabolic or semi-spherical) is used so as to obtain the even distribution and supply of heat radiations. Some of the rays from the heater can be projected parallel to each other and some emanate radially from the filament to produce a mixing effect.

Areas contiguous to the area of contact of the plastic bodies which is brought to incipient fusion temperature, for joining, may also be heated to some degree to minimize the effects of differential heating within the plastic bodies. Hence it is acceptable to heat the plastic bodies by radiant heat out beyond the area of contact and define the area of contact to be joined by a juxtaposed partial heat transparent area of the presser plate (when used) and the underlying heat absorber surface.

According to the present invention it is preferred that the radiant heater be equipped with controls so that it may be started and stopped very quickly, so as to afford a sharp beginning and ending of the heating cycle.

Also, according to the present invention it is preferred that the radiant heat rays (and visible rays which are also usually coincidentally generated) be first projected through a presser surface, which is made of a material capable of transmitting the radiant heat rays almost without diminution, and which has inherent characteristics such that it will retain its structural integrity at temperatures well above the temperatures at which the plastic bodies, to be joined, will be fused. For this element there may be utilized a plate which may be made of quartz or temperature resistant glass such as Pyrex (trademark) or Vycor (trademark). The objective is to utilize the plate as a presser surface, which presses the plastic bodies against the heat absorber-radiator surface, which in turn may be supported by a resilient padding, so as to insure even distribution of pressures against the plastic bodies which are to be joined.

Such presser plate may be used in its initial condition, where the heat captured by the plastic bodies and conducted thereto by the heat absorber suffices rapidly to heat the plastic to fusion for joining. However, assistance in the heating, may, as explained above, be provided by making a portion of the normally transparent presser plate slightly less transparent especially on the surface thereof which contacts the plastic body which it faces and contacts. Such slightly less transparent area may be made substantially coextensive with the area of contact of the plastics which are to be joined and hence also subtsantially coextensive with the heat absorber area. In this way, some heat is captured from the projected heat radiations at the very surface of the transparent presser plate which contacts one of the plastic bodies and which is coextensive with the area to be joined and assists in supplying heat to the plastic bodies for bringing them to fusion temperature.

In joining thin plastic sheets, strips, etc. where there is no problem of depth of plastic, the presser plate can be merely a clear quartz sheet devoid of partial heat absorbing surface features, and good results are obtained.

In carrying out the heating of the plastics preparatory to fusion joinder according to the present invention, it is preferred that areas of the plastic bodies which are to be joined, adjacent the portions which are to be joined, be heated to some degree, so that there is not a sharp line of demarkation between these portions of the plastic which are joined by the fusion and those adjacent such joined portions. In this way, stresses which might impair the strength of the joined plastic bodies at the edges of the joinder are avoided.

While the invention is not limited to the joining of only sheet plastics, it is especially useful for such purposes, and the illustrations herein of the methods and apparatus are with reference to plastic sheet materials. These are exemplary and are not a limitation upon the general utility of the invention.

One form of apparatus for joining plastic bodies such as plastic sheet or plate is illustrated in FIGURES 1 and 2. In this illustration there are several tools which are used in cooperation. The plastic bodies are the two pieces P1 and P2. In this instance these are strips of plastic and the thickness may vary from a few thousandths of an inch to somewhat thicker plastic. For example, high temperature plastic tape of one to several thousandths of an inch thick may be joined, or thicker strips may be joined. At the bottom there is a work support S on which there is placed a buck generally designated 10, consisting of a solid inner core 11 having resilient padding 12 and an outer cover 14. For example, the padding can be woven asbestos cloth of several layers or similar material which are resistant to temperatures being encountered, and yet provides a certain amount of resiliency. On the exterior, the surface 14 may be composed of glass cloth, or very thin metal foil of a durable metal. Along the central portion of the surfacing layer 14 of this buck there is provided a black strip 15 which can be made by applying high temperature resistant black paint, such as graphite paint. The surface 15 thus acts as heat absorber and heat radiator, as previously stated. The two plastic bodies P1 and P2 which are to be joined are overlapped at 16, with the end 17 of the under strip P1 at approximately the side edge 15L of the blackened area 15 and the end 18 of the upper strip P2 at approximately the edge 15R of the blackened strip. The area of the two plastic bodies P1 and P2 which are in contact, i.e. the area of contact which will ultimately be joined is designated 19.

Over the strips P1 and P2 there is placed a sheet 23 of transparent material such as quartz, through which radiation from a heat source may easily pass without substantial diminution. The quartz sheet is strong enough to transmit force downwardly against the two strips P1 and P2 to hold them tightly against the buck 10 during the heating and fusion welding operation. The upper element generally designated 20 is the radiant heater and in this embodiment consists of a rectangular body having a parabolic undersurface 21, at the focus 22 of which is located the filament 24 of the lamp 25. The mounting brackets and electrical supply leads of the heat lamp 25 are not illustrated as these are conventional. It will be understood that an on-off switch is provided for lamp 25. The lamp 25 is located so that the hot filament 24 is at, or is approximately at, the focus 22 of the parabolic undersurface 21 of the unit. At the top there is provided a handle 26 for manual manipulation.

FIGURE 2 shows how the components of FIGURE 1 are brought together as during the fusion welding of the strips P1 and P2. The strips are placed on the buck with the overlapping ends 16 approximately over the blackened area 15. The quartz plane 23 is then placed over the plastic strips. Then the heater unit 20 is placed on the quartz plate 23, the lower edges 20L and 20R of the heater unit resting against the edges of the quartz plate. Then the lamp 25 is energized by manual or timer control through circuit and control switch not shown. Any conventional circuit leading to the lamp may be used and a timer switch may be utilized so as to time the energization from one to several seconds (for thin sheets), or longer, depending upon thickness of sheets, heat absorption characteristics of the plastic, temperature and amount of heating desired. Simultaneously the handle 26 is gripped and force is applied downwardly in the direction of arrow 27. The lamp is then de-energized, and force is continued downwardly on the handle until the heat dissipates.

The energization of the lamp 25 causes rays of heat energy (and also incidental light energy) to be projected downwardly in the direction of arrows shown in FIGURE 2. Some of these rays will be parallel, where a parabolic under surface is used whereas other rays will radiate from the filament 24. It is desirable that these rays be generally evenly distributed. These rays pass through the quartz plate and thence through the portion of strip P2 which is under the plate 23 which includes the area 19 and through strip P1 which is under the strip P2. The rays then impinge upon the upper surface of the outer covering 14 of the buck and this includes the blackened area 15 of the buck. The heat energy is absorbed by the whole surface of covering 14 which is therefore heated but the blackened strip 15 will heat most and the temperature of the blackened area 15 is quickly elevated. Some portion of the heat radiations are absorbed by the quartz plate and, depending up the characteristics of the plastic bodies P1 and P2, some of the heat radiations are absorbed within the body of the plastic itself. The remaining radiant heat energy is absorbed by the blackened area 15, which being thus heated, the heat is conducted back into the plastic bodies P1 and P2. As a consequence, the plastic strips are rapidly heated, and especially so in the area 19, which is coextensive with the blackened area 15 which forms the heat absorber on the buck 14. This quickly elevates the temperature of the plastic strip especially where P1 overlies area 15, and the strips meanwhile are subjected to pressure and are joined, thus attaching the two strips P1 and P2 together.

The heater 20 is energized for only so long as is needed to bring the plastic area 19 of the stage of incipient fusion, sufficient only to cause the strips to become tacky enough to adhere together at surface 19. The temperature at which this occurs depends entirely upon the plastic being joined, and the present invention may be utilized with any plastic which is capable of transmitting at least a part of the radiant and light energy from the heater and is capable of fusing. Almost all unfilled plastics, i.e. those not containing a filling or coloring matter, will fuse. There are presently available plastics which have a fusion temperature in the range of 800° F.–900° F., which are admirable as insulating material for high temperature electrical apparatus. The welding of such plastics has not been possible by any previous methods and the methods and apparatus of the present invention are admirably suited for the joinder of such plastics. Thus the strips P1 and P2 may be thin films, in strip form, of high temperature plastic which are, pursuant this invention, attached together in the area 19. This can be accomplished in a few seconds by simultaneous application of heat and force against the areas which are to be joined. In this way continuous lengths of plastic strip may be made, for application for electrical wiring and other high temperature installations requiring such plastic tape covering.

FIGURES 3–8 illustrate another embodiment of the invention. In these figures there is provided a base generally designated 40 which may be attached by screws 41 to a suitable supporting surface such as a bench. Upon the base there are mounted a left pad 42 and a right pad 44 which are similar except that one is a right and the other is a left, and are attached by means of the screws 45 inserted under base 40. The pads are shaped so as to provide a slot 46 between them, in which there is situated a buck generally designated 10 which can be constructed as previously described with reference to FIGURES 1 and 2. In this instance the buck 10 is provided with a central core 11, which has a soft heat resistance padding 12 thereon which is covered by a high temperature surface layer 14, such as woven fiberglass cloth, or a very thin sheet of metal such as stainless steel or other metal of a few thousandths of an inch thickness. This is wrapped around the core and the core is attached to the base by means of the screw 46, which serves to hold the padding and the surface material 14 in place. On the upper surface there is provided a blackened area 15, as previously described relative FIGURES 1 and 2. In FIGURE 4 this surface 15 is shown of exaggerated thickness. It is actually very thin, merely a surface layer of blackening.

The top of the buck at the area 15 is somewhat elevated above the upper surfaces of the two pads 42 and 44. Pads 42 and 44 are provided with recesses 47 and 48 respectively. At the back of the pads 42 and 44 there are elevated brackets 49 and 50 respectively, which serve as mountings for the pins 51 and 52 on which the rear end of axles 53 and 54 are pivotally attached for upward swinging movement. Journalled thereon for easy rotation and held in place by lock rings there are provided rollers, as at 55 on the axle 53 and 56 on the axle 54. At the front of the pad 42 are a pair of pins 58 and at the front of the pad 44 there are a similar pair of pins 59. These pins serve to locate the axles 53 and 54, respectively, when they are swung down into the position shown in FIGURE 3.

Under the roller 55 there is journalled a roller 60 on axle 61 which is mounted in the pad 42, and under the roller 56 there is similarly situated a roller 62 on the axle 63. When the upper rollers 55 or 56 are brought down they will engage their lower rollers and will engage a strip of plastic placed between them. Rollers 55 and 56 may be rotated by finger movement, as shown in FIGURE 8, and this provides a convenient way for advancing or withdrawing the ends of the plastic strips P1 and P2 respectively, for alignment preparatory to welding.

Also mounted upon each of the pads 42 and 44 are cutoff guide units generally designated 67 and 68. These are similar except that one is a "right" and one is a "left" and hence only one need be described. Referring to FIGURE 6, which illustrates the unit 67, it will be noted that it consists of a thick lower piece of plastic 69 and a thick upper piece of plastic 70 which are attached together at 71. The upper piece of plastic is narrower than the lower piece, and hence exposes the area 69A of the lower plastic 69, see FIGURE 3. The two pieces of plastic are provided with a notch at 70 at their rear ends, adapted to be engaged under thumb nut 71 at the rear of the support pad 42. At the front of the support pad there are provided two pins 72, 72 which locate the front end of the cut guide 67. The front of the support pad is also provided with a cutout notch 74L of semi-circular configuration so as to permit easy insertion of a finger under the front of the unit 67 for lifting it. The upper narrower strip of plastic 70 has a straight edge 70A which is at right angles to the lay of plastic strips P1 and P2 across the machine.

When it is desired to trim the end of the plastic tape P1 it is inserted entirely across the machine as shown in FIGURE 4, with its end P1E being drawn out between the two layers 69 and 70 of the plastic. Then the thumb nut 71 is tightened thus holding the plastic tightly in place. Of course, this is done before the strip P2 is inserted in the machine. Then a razor blade or other sharp cutting instrument at B, see FIGURE 4, is drawn along the edge 70A, see FIGURE 3, and this cuts off the protruding end P1E of the strip P1, and trims it square with the length of the strip.

The other unit 68 is for the strip P2 which is inserted between the rollers 55 and 60 and drawn completely across the machine and placed between the upper and lower plastic members of the unit 68, with the end P2E protruding as shown in FIGURE 4. The thumb nut 75 is then tightened down and a cutting blade B is drawn along the edge 68A and hence severs the end piece P2E of the strip P2, thus making this strip square at the end in relation to the length of the strip P2. Both of the thumb nuts 70 and 75 are then loosened, and this frees strips P1 and P2. By applying the fingers as shown in FIGURE 8, these rollers 55 and 56 may be rotated so that the then trimmed ends of the strips P1 and P2 are drawn back so that they overlap each other in the area to be joined, and these overlapped areas will lie over, or approximately over the black heat absorber area 15 on the buck 10. In this way strips of plastic tape can be quickly trimmed and by simple finger movement then drawn back into registry with the ends overlapping over the area 15 preparatory to fusion welding.

The heat unit 20 as shown in FIGURE 1 may be used without modification in FIGURES 3–8. Thus the plate of quartz 23 is first placed over the overlapping plastic strips. Then the heater unit 20 is applied to the quartz plate and the lamp is energized. The energization of the lamp may be timed by hand or by a customary timer switch for a period of a fraction of a second to several seconds, sufficient to heat the plastic and elevate the temperature to the fusion welding temperature. In FIGURE 3 there is shown in dotted lines at 20A a somewhat enlarged housing for the heater unit provided with wiring connections 20B and cooling water (or air) connections 20WL, so that fluid may be introduced into cooling chambers within the body 20 of the heater unit for maintaining the body of the unit and the reflective surface 21 cool. Cooling fluid will not be needed when the device is only used occasionally, but for repeated work, where the heater is used steadily, time after time, its temperature may gradually elevate, and under such circumstances cooling is desirable. In some instances air lines may be connected to the connections 20WL and air circulated through the heater unit to keep it cool.

After the strips P1 and P2 have been fusion-welded, the heating unit 20 and quartz plate 23 are removed. Then the thumb screws 71 and 75 are loosened and by inserting the finger in the notches 74L and 74R, the front end of the units 67 and 68 are disengaged from the pin 72 and are drawn forwardly, thus slipping off of the tapes P1 and P2. Then by finger movement the front ends of the axles 53 and 54 are swung up and this elevates the rollers 55 and 56, thereby clearing the entire apparatus so that the strips P1 and P2, which are at this time joined together in the area 19, can be entirely removed as the unit. This completes the operation.

FIGURES 10–15 illustrate an embodiment of the invention, similar to that shown in FIGURES 3–8 except that the machine is, to some degree, mechanized for the purpose of applying pressure of the heating device on the quartz plate, and hence upon the plastic being heat welded, and for also timing the duration of the operation of the heating lamp. In this embodiment shown in FIGURES 10–15, the portion of the machine including the base plate 40, the support pads 42 and 44, the rollers 55–60 and 56–62 and the support and cutoff guides 67, 68 as well as the buck structure 10 are all precisely the same as previously described with reference to the embodiment shown in FIGURES 3–8, and will not be further described. However, upon the base plate there is mounted a rearward extension bracket 40R, see FIGURES 10, 12 and 13, which serves to support a pivot shaft 80 upon which two forwardly extending arms 81—81 are pivoted. The forward ends of arms 81 carry a cross shaft 82 which extends through the body of the heating element 20. The heating element is in this instance supplied with a housing 20H, to which the electrical connections 20B and the cooling connections 20WL are attached. This housing also has a top handle 20K, see FIGURE 12. The arms 81—81 have an extension 81A, which hits against the stop pins 81B on the support 40R, to hold the arms 81 and hence the heating element 20 and everything attached to it in the elevated or "open" position shown in solid lines in FIGURES 12 and 13.

Also attached to the arms are pins 84 at each side, to which flexible cords 85 are attached, one to each arm. These cords extend forwardly and then pass through a smooth guide-hole 86 in the base plate 40 and the pads 42 and 44 at each side of the buck 10. The cords 85 extend downwardly and are tied together at a knot or "eye" 86 and then extend as a single strand at 87 and are attached at 88 to a spring 89 which is in turn attached to an eye 90 on the underside of the base plate 40. This arrangement forms a bridle which extends around the shaft 91 of the geared motor 92 which has power input terminals 93 extending via lines 94 to the terminals 95 of a timer-pressure control 98, which is served by input lines L1 and L2. The pressure control 98 is manually adjustable at resistor 98A so as to vary the power input applied to the motor 92 and has a timer 98B for a period of zero to 120 seconds, or longer for varying the time pressure is applied. The shaft 91 is provided with a spike 91S, see FIGURE 12, and shaft 91 rotates in the direction of arrow 96. When the motor is energized, the spike 91S will revolve inbetween the strands 85 and engages the knot 86, and exerts a pull on the two strands 85 thereby pulling down on the arms 81—81, to thereby exert a pressure of the heating unit 20 against the quartz plate 23. The duration that pressure is exerted is varied by means of the timer control 98B and the amount of pressure is regulated by the control 98A. The pressure control is thus variable in the amount of pressure and the time of duration, to suit the particular need of the plastic, being fusion-welded together.

It will be noted that the motor 92 is not intended for moving the heater unit from the full line to the dotted line position shown in FIGURES 12–13, this being done by the operator. The operator manually moves the heater from the position shown in full lines in FIGURE 12 to the position shown in dotted lines, and in so doing the spring 89 will contract and keep tension upon the cords 85 pulling them down through the holes 86 until the knot (eye) 85A has passed around to a position just under the shaft 91. The motor 92 has a spring return, and always revolves reversely after being de-energized, to a parking position with the spike 91S in an upright out-of-the-way position, as shown in FIGURE 12, preparatory to the next cycle. The spike 91S therefore does not interfere with the free running of the cord assembly 85–85A–87 around the smooth surface of the shaft 91, and is ready to proceed into engagement with the knot 85A for pulling the cords, on the next cycle of operation.

Also provided in this embodiment of the invention are a pair of arms 92, one on each side of heater 20, which are pivoted at 94 on a suitable bracket 95 on the base plate. These arms are provided with slots to receive the edges of the quartz plate 23 and the plate 23 is thus able to be moved manually by finger pressure on arms 92 for lifting it arcuately upwardly from the full line position shown in FIGURES 12 and 13, in which position it is engaged upon the plastic strips, to an elevated position as shown in dotted lines in FIGURES 12 and 13.

The power supply for the heater lamp in the heater unit 20 is provided with a control generally designated 100 as shown in FIGURE 11. This control includes a timer 101 and a heat intensity control 102. The circuit is not illustrated but it will be understood that power is supplied by lines L1 and L2 through a resistor, shown, or variable transformer, or other suitable network, controlled by the intensity control 102 which may be manually adjusted by knob 102. The circuit then includes a timer switch 101 which times the duration of heating. The switch 100 resets to zero after each cycle. The series circuit (not shown) for unit 20 thus extends from line L1 through the intensity control resistor which is adjustable by means of knob 102 and through the timer switch which is controlled by knob 101 and thence through the lamp and back to line L2. The circuit from the control 100 to the lamp itself is via lines 104 which extend through the cable 20B of FIGURE 12. In this manner the duration of heating and the intensity of heating can be adjusted and the time that pressure is exerted and the intensity of pressure can likewise be adjusted.

FIGURES 16, 17, 18 and 19 illustrate a further embodiment of the invention which is provided for fusion-joinder of wide plastic sheets or foils. This device includes a base plate 110 having posts 102, 102 and 104, 104. The posts serve to support tracks 105 and 106 which have, respectively, racks 107 and 108 on them, on which the gears 109 and 110 respectively are adapted to rotate. The gears are on a common shaft 111 which extends through a slot 112 in an upstanding bracket 114 on housing 115 of the heat unit 20. On each side of the housing of unit 20, there are provided drill holes in the under edges 20R and 20L of the housing, see FIGURE 18, into which upwardly extending pins 116—116 attached to shoe 117 are adapted to extend, the shoe 117 being normally spring pressed downwardly by the springs 118–118. These shoes 117 (one on each side of housing of unit 20) are adapted to press downwardly and slide upon the upper surface of the quartz plate 120 (which corresponds to the strip 23 in the embodiments of the apparatus previously described). The strip 120 is held in a frame 121 which has a thin retaining strip 121A, see FIGURE 17, at the bottom for holding the quartz strip in place. A plurality of short quartz plates set end-to-end may be used instead of a continuous strip, if desired. The quartz plate 120 is adapted to bear downwardly on the plastic sheets or films P1 and P2 which rest upon the blackened heat absorber surface 15 on a padded buck 10. The buck in this instance is elongated so as to extend fully across and slightly beyond the width of the widest strip of plastic material desired to be fusion welded. A motor 124 is attached to the housing 125 which encloses the gear 110, and is provided with a gear 127 which is also adapted to ride upon the rack 108, and hence will propel the housing 125 along the track and this causes the gear 110 to be rotated, which in turn rotates the gear 109 on the other end of shaft 110 which moves the housing 126 at the other track, hence insuring parallelism of motion. The motor 124 may be provided with a speed control 128 if desired, that is adjustable by means of the crank handle 129. As shown in FIGURE 16, a strip P1 of plastic sheet is to be joined to a strip P2 and these are overlapped in the area bounded by the edges 15L and 15R of the blackened heat absorber strip 15 on the top of the padded buck 10. The frame 121 which holds the quartz plate 120 is supported by pivots 130 which extend through the brackets 131, 131 attached to the base plate 110. The location of these pivots is such that the right end of the frame 121R as shown in FIGURE 16 will swing down when the left end 121L as shown in FIGURE 16 is elevated by hand. Of course, in order to lift the frame 121 it is necessary to run the heater element generally designated 20 to the right as shown in FIGURE 16 until it parks in the area 120R at the right end of the quartz plate beyond the right edge P1R–P2R which forms the right edge of the two strips P1 and P2 that are to be heat welded together. When the heater has been moved to this position, the left end 121L of the frame 121 can be lifted and swung upwardly and it is temporarily held in place while again placing ends of the strips P1 and P2 in registry in the area to be welded.

Normally, the heater element 20 makes one round trip from right to left as shown at FIGURE 16 along the quartz 120 and then from left to right and in so doing projects radiant heat energy along an area including the strip defined by the edges 15L and 15R of the buck on which the quartz plate 120 will normally rest, when the frame 121 is in the down position as shown in FIGURES 16 and 17, and holds the plastic sheets in place. Heating may be omitted from the return movement from left to right, if desired, or may be reduced in amount.

On the posts 102—102 there are provided normally closed limit switches 132 and 134, which are adapted to be engaged by the prongs 132A and 134A on the side of the housing 126.

The circuit diagram for the embodiment of the invention illustrated in FIGURES 16–18 is shown in FIGURE 19. From line L1 a circuit extends via junction 135 and thence through normally opened start switch 136 to junction 137 and thence through normally closed limit switch 134 and through the coil of relay 138 to junction 139 on line L2. The circuit also extends from junction 137 to junction 140 and then through normally closed limit switch 132 through the coil of relay 141 to junction 142 on line L2. From junction 144 on line L1 a circuit extends through contacts 145 of relay 130 and thence through junction 146 to junction 137, for sustaining the circuit through relay 138 once it has been energized. Similarly from junction 147 a circuit extends through contacts 148 of relay 141 and thence through junctions 146 and 140 to junction 137 to sustain the circuit through relay 141 once it has been established. As previously noted, the housing 126 over gear 109, see FIGURE 16, carries two prongs 132A and 134A which are adapted to engage the operating staffs of the limit switches 132 and 134, respectively. These switches are normally closed by a spring element, not illustrated.

From the three phase lines P1, P2 and P3 circuits extend through a three circuit, gang controlled resistor unit 128, the setting of which can be manually controlled via the knob 129. The circuits then extend through the relay contacts 148, 149 and 150, respectively, when the relay 138 is closed, and cause rotation of the motor 124 in a direction as will be explained. Circuits also extend from the junctions 151, 152 and 153 through the contacts 154, 155, and 156 to junctions 157, 158 and 159 and thence to the motor 124 for rotating the motor in the opposite direction. It will also be noted that a circuit extends from line L1 through manually adjustable resistor 160 thence through either the contact 161 of relay 138, or through a parallel circuit via switch 163 and contact 162 of the relay 141, and thence through the heater lamp 24 of the heater element generally designated 20 and thence to line L2. By varying the position of the control knob 160A the heat intensity provided by the heating element 20 can be varied.

Referring to FIGURE 16, the buck 10 extends from the right side 10A to the left side 10B but the quartz plate 120 carried by the frame 121, extends well beyond the right and left ends of the buck. The end areas 120R and 120L of the quartz plate are the "parking areas" for the heater 20. Normally a pass from right to left and then a pass from left to right will constitute a complete cycle when utilizing the apparatus of this embodiment, and the heater unit 20 is normally parked at the right in area 120R when a change of strips is made for removing the strip already welded and for placing the ends in overlapping relation of two fresh strips to be welded. Consequently normally the switch 132 is in the open position at the completion of the cycle of operation and switch 134 is in the closed position.

Assuming the apparatus is in such condition, when the push buttom 136 is closed, the circuit is established via the then closed limit switch 134 and through the coil of relay 138 thus energizing this relay, and the closure of its contacts 145 will establish a self-sustaining circuit for maintaining the relay closed until subsequently the limit switch 134 is opened. The closure of relay 138 causes the motor 124 to rotate in a direction to move the heater element 20 from the right to the left as shown in FIGURE 16 and in so doing the heat lamp is energized by the closure of contacts 161 of relay 138. The motor 124 continues to operate at a speed as determined by the setting of knob 129 and resistors 128, until it has moved to a position where the heater lamp 20 is in the parking area 120L, beyond the left edge P1L–P2L of the strips P1 and P2 being fusion-welded together. When the prong 134A hits the limit switch 134 the motor 124 is de-energized by the opening of relay 138. The operator then pushes the start button 136 a second time, and in this instance, limit switch 132 being closed, will energize relay 141, through the closure of its contacts 154–156 will cause the motor 124 to rotate in the opposite direction and through the closure of its contacts 162 will energize the heat lamp 24 of the heater unit 20, provided the switch 163 is closed. This switch is provided so that heat may or may not be utilized on the reverse pass from left to right as shown in FIGURE 16 but in any event the motor 124 continues to operate until the heater unit 20 is again brought to the area 120R of the quartz plate 120, where the heater unit is parked. In this position the heating unit is out of the way so that when the frame 121 is elevated at the left, as shown in FIGURE 16, and propped up, the then fusion-welded strips P1 and P2 may be removed, and fresh strips placed in the machine for joining. Where it is desired to do so switch 163 may be closed during some or all of the return paths, this is done manually.

In any of the embodiments of the apparatus shown in the present invention, the transparent presser plate 23 of the embodiment shown in FIGURES 1–15 and the transparent presser plate sheet 120 of the embodiment shown in FIGURES 16–19, may be vapor blasted, i.e. as by sand blasting, on its under surface, which contacts the plastic sheets which are to be fusion-welded together. The under surface of the transparent sheet (23 or 120) which is of quartz or suitable glass, may be thus provided with a mat surface over the entire under area of the sheet, or if desired, throughout a strip area corresponding to the heat absorber blackened area 15 of the padded buck. This is illustrated in FIGURE 20 where the sheet 23 or 120 is shown as having a vapor blasted surface on its under side extending from the line 23L to the line 23R. This is illustrated as being located so as to overlie the heat absorber surface 15 but it will be understood that the area between the lines 23L and 23R may be increased in width, or the entire transparent sheet 23 or 120 may be vapor blasted, if desired.

The reason for this variation is to provide some but not full transmission of heat (and light) radiant energy downward through the sheet 23 (or 120). By providing a vapor blasted (such as sand blasted) area between the lines 23L and 23R of the transparency, some of the downwardly transmitted radiant energy is captured on the under surface of the sheet 23 or 120, and this causes heat to be conductively applied to the upper surface of the uppermost plastic sheet which is being fusion-welded to the lower plastic sheet. The degree of entrapment of heat by this vapor blasted under surface may be varied widely, from a few percent to a major percent of the heat which is transmitted. Only a portion of the heat is captured on such under surface. Indeed in the normal operation there is some percentage of the heat which is captured even by a "clear" transparency 23 (or 120), but not much.

In FIGURE 21 there is illustrated a further embodiment of the invention wherein a thermal sensor coupled to a heat control for the heater 20 is incorporated. Thus the thermal sensor may be located on the blackened surface 15 of buck 10, or may be located on the under surface of transparent (or partly transparent) sheet 23 (or 120) or may be located in the plastic bodies (as test samples) as at the area of contact 19. Wherever located the thermal sensor provides an indication of temperature at the weld and the temperature signal is taken back to a controller for heater 20 so as to regulate the heater so as to provide a desired temperature.

As illustrated in FIGURE 21, the heat absorber strip is provided with a thermal sensor 150 so situated as to register the surface temperature of the blackened area 15. This is connected through leads 151 to a temperature control unit generally designated 152 which is provided with an adjustment 154 by means of which the amount of power flowing to the heat lamp 25 via lines 20B may be varied in accordance with the temperature signal input from lines 151 from the temperature sensor 150. Thus by changing the adjustment of 154, the power supplied from lines L1 and L2 through the controller 120 may be varied, so as to raise or lower the temperature of the strip 15 on the buck.

Likewise, if desired, the temperature sensor may be applied to the under surface of the transparency 120 for measuring the temperature of such under surface. Thus the temperature sensor 150 may be placed either in the buck 10 or on the under surface of the transparency 23 or 120. Also, if desired, a suitable test sample of two pieces of plastic sheet to be joined may be arranged with the sensor 150 at surface 19 where they are to be welded together and the sensor then connected to the controller 152. In this way the actual temperature of the material being fusion-welded may be determined at the place where welding occurs. Obviously in such instance the thermal sensor 150 will be lost with the sample, but once established with a series of samples which are welded together, the controller 152 is then left in the adjustment thus made, and production is then run without further adjustment.

In the embodiments of the apparatus of the invention the heat unit 20 has two functions, i.e. (1) the function of applying pressure against the presser plate 23 (or 120) and (2) generating the heat energy radiations which pass through the presser plate (where used) and the plastic bodies and are projected onto the buck 10. It is evident that these two functions can be separated by, for example, applying pressure (by hand or suitable mechanism such as an air cylinder or spring) against the levers 92 (of the embodiment shown in FIGURES 12–13) or against the frame 120L–120R (of the embodiment shown in FIGURES 16–18) to force the levers 92 or frame 120L–120R downward and hence move the quartz plate 23 (or 120) against the buck. In such event, the heater 20 can then be independently supported in proximity to but above the quartz plate 23 (or 120), its only function then being to generate and downwardly project the heat rays.

As many widely apparently different embodiments of this invention may be made without departing from the spirit and scope thereof, it is to be understood that we do not limit ourselves to the specific embodiments herein.

What we claim is:

1. An apparatus for joining by fusion and pressure plastic bodies capable of transmitting heat energy radiations comprising:
   a padded buck having on the surface thereof a heat absorbing area of a shape corresponding with the area of contact of the plastic bodies to be joined,
   a presser plate for exerting pressure against said buck for holding the plastic bodies under pressure while they are being joined,
   said presser plate being of a material capable of transmitting at least some proportion of heat energy radiations projected upon it,
   pressure means for exerting pressure through the presser plate and against the buck,
   heater means for generating and projecting heat energy radiations for projection through the presser plate and onto the buck.

2. The apparatus of claim 1 further characterized in that the presser plate is provided on its under surface with a heating area generally conforming to the heat absorbing area of the buck, wherein a greater proportion of heat radiations are captured and a lesser proportion are transmitted than in portions of the presser plate outside of said heating area.

3. The apparatus of claim 1 further characterized in that means is provided for movably supporting said heater for movement toward and away from a position where it will project heat radiations toward the buck.

4. The apparatus of claim 1 further characterized in that means is provided for movably supporting said presser plate for movement toward and away from the buck.

5. The apparatus of claim 1 further characetrized in that swinging arm support means is provided for the presser plate and heater means for swinging them toward and away from the buck.

6. The apparatus of claim 1 further characterized in that the presser plate is made of a material selected from the class consisting of quartz and high temperature resistant glasses having low heat coefficient of expansion.

7. The apparatus of claim 1 further characterized in that the heat absorbing surface of the buck is elongated in the nature of a strip.

8. The apparatus of claim 1 further characterized in that the heater is shaped so as to project heat energy radiations directly and so distributed that a transverse section through the axis of said radiations will be an elongated area in the nature of a strip.

9. The apparatus of claim 1 further characterized in that power means is provided for applying pressure through the presser plate and against the buck.

10. The apparatus of claim 9 further characterized in that power timer means is provided and is connected to said power means for controlling the operation of said power means.

11. The apparatus of claim 1 further characterized in that heater timer means is provided and is connected to said heater for controlling the duration of operation of said heater.

12. The apparatus of claim 1 further characterized in that means is provided for supporting strip plastic bodies for joining and means is provided for trimming them.

13. The apparatus of claim 1 further characterized in that means is provided for moving the heater relative to the plastic bodies while they are undergoing joining to increase the area to be joined.

14. The apparatus of claim 13 further characterized in that power means is provided for controlling movement of the heater means.

References Cited
UNITED STATES PATENTS 3,247,041    4/1966    Henderson _____ 156—272

DOUGLAS J. DRUMMOND, *Primary Examiner.*